Patented June 3, 1947

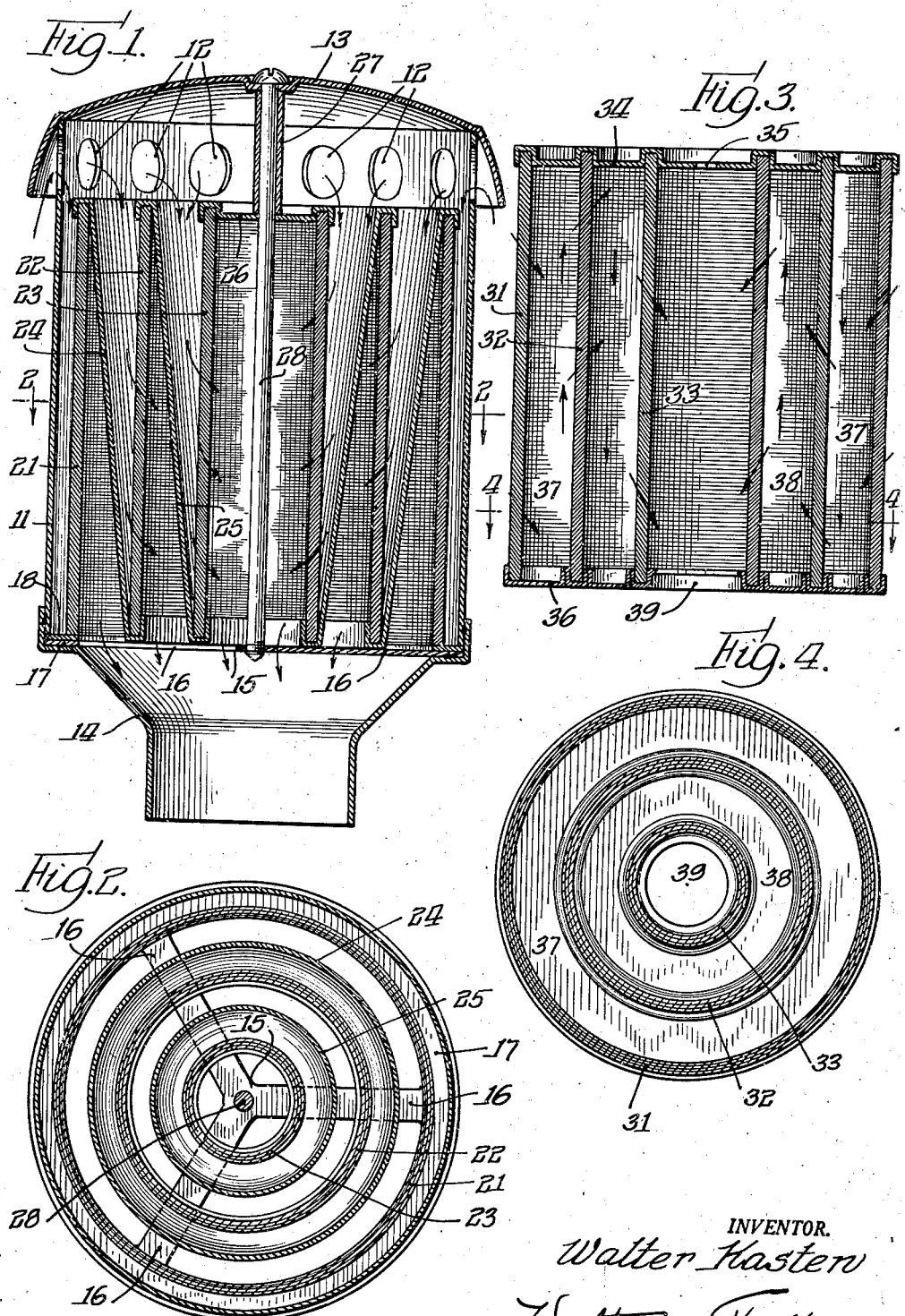

2,421,705

UNITED STATES PATENT OFFICE 2,421,705

FILTER

Walter Kasten, Franklin, Mich., assignor to
Ralph L. Skinner, Detroit, Mich.

Application February 16, 1943, Serial No. 476,081

4 Claims. (Cl. 183—73)

This invention pertains to filters and relates more specifically, but not necessarily restrictedly, to air-filters, although the principles involved can be employed in filters for other or comparable purposes.

One aim of the invention is to provide an efficient filter, of simple structure, which is relatively cheap to manufacture and hence salable at such a comparatively low price as to justify the removal and disposal of the filtering media and their replacement by other new ones as needed for efficient operation.

Another object of the invention is to supply a type and style of filter-pack which is especially potent in the performance of its filtration functions.

An added purpose of the invention is to furnish a construction from which the old filter media may be easily removed and fresh ones readily substituted therefor.

An understanding of the new structures and their modes of operation will afford a recognition of the advantages supplied by the employment of the novel filters incorporating the features of this invention.

Accordingly, in the accompanying drawing forming a part of this specification, present preferred embodiments of the invention have been illustrated in detail and such drawing should be referred to in connection with the following detailed description.

For simplicity, in this drawing, like reference numerals have been used to designate the same parts.

In this drawing:

Figure 1 is a longitudinal, central section through one style of the filter;

Figure 2 is a horizontal cross-section on the 2—2 of Figure 1;

Figure 3 presents a different form of filter-pack usable in the housing or casing illustrated in Figure 1; and Figure 4 is a horizontal cross-section on lines 4—4 of Figure 3.

By reference to Figure 1, it will be noted that, in this particular embodiment of the invention, the encasing body of the filter comprises a cylindrical metal casing or housing 11 having a series of air-inlet ports 12, 12 therethrough near its top end, the latter being closed by a suitable cover 13 overhanging the ports 12, 12, the other or lower end of such casing being connected in suitable manner to a discharge or delivery conduit 14, which, for instance, may be demountably joined to the air-inlet conduit of a carburetor of an internal-combustion engine, not shown.

Secured between the lower end of casing 11 and the conduit 14 is the marginal portion 17 of a round frame, characterized as a whole 15, having a center part from which radiate a plurality of arms 16, 16 merging at their outer ends into the border ring-portion 17.

Also bound between the bottom end of such casing 11 and such part 17 is the marginal portion of a round rubber or other resilient sealing-gasket 18.

The filtering-means used in such casing 11 comprises a plurality, in the present instance three, of hollow, cylindrical filter-shells; a large one designated 21, one 22 of intermediate diameter, and a smaller one 23, all arranged concentrically inside of one another in the order stated and spaced apart with the largest one also spaced inwardly away from the circular wall of the encasing housing 11 to leave the external surface of such element 21 exposed in such casing.

Each of these filter shells or bodies is desirably composed or formed of a spiral-winding of a ribbon or tape of crepe-paper or other comparable material, the contacting, overlying convolutions of which and the spaces between them are at an oblique angle to the axis of such body, and the convolutions of which are impregnated or charged with a polymerized phenolic-resin which renders the filter-element unaffected by the fluid to be filtered and/or by any of its contained contaminants, such coils or convolutions of the body being adhered together by such resin, which consolidation or cementation does not, however, close the shallow gaps or spaces between such windings, but which converts the wound body into an easily-handled and strong unit.

This type of filter element constitutes the subject-matter of my United States Patent No. 2,380,111, Walter Kasten, Helically-wound bodies, granted July 10, 1945.

The space between the outermost filter-member 21 and the next inner one 22 is blocked off by an inwardly downwardly-converging partition-wall 24 of pasteboard or comparable or equivalent material impregnated or charged with a like or equally-functioning polymerized phenolic-resin, although such wall could be made of metal or similar material requiring no such impregnation.

As is clearly shown, the top edge of such partition-wall 24 is bent over the upper edge of filter-element 21 to which it is adhered by the resin referred to, and the lower edge of part 24 is bent around under the bottom edge of the next filter-element 22 to which it is likewise adhered.

In similar manner a comparable division or septum wall 25 is located between the two filter-elements 22 and 23 and it is likewise folded over and adhered in like manner to the top and bottom edge portions of such filter-elements.

When thus arranged and cemented together, the several members 21, 22, 23, 24 and 25 constitute a single, firm and rigid unit.

As is portrayed in the drawing, the upper end of the hollow filter-member 23 is closed by a centrally-apertured, resin-charged pasteboard or metal disc 26 having a margin recessed, fitted over and adhered to the top edge of such part 23.

Between the top face of such disc or cap 26 and the under surface of the closure 13 and engaging both of its opposite ends is a sleeve or bushing 27.

To detachably hold the parts of the structure together in proper operative relation, a long screw 28 extends through a centrally-located hole through the cover 13, the spacing-sleeve 27, the aperture in disc 26, and filter-member 23, the lower threaded end of the screw fitting in a screw-threaded hole in the central part of frame 15.

This single screw normally maintains all of the stated parts in the assembled relation depicted in the drawing.

When it is necessary or desirable to clean the filter, it may be readily detached or demounted from the member (not shown) which the conduit-element 14 engages, the screw may be taken out, and the inside of the filter easily cleaned by removal of its elements, inverting them and wiping them if necessary, whereupon the members of the filter may be reassembled with facility and dispatch, it being noted in this connection that, as stated above, the elements 21, 24, 22, 25 and 23 constitute an easily-manipulated unit-structure.

When such unit or pack requires replacing by a new one the manner in which this may be accomplished is quite obvious.

In Figures 3 and 4, a somewhat different filter-unit is disclosed, and in this case, the three, concentric filter-shells 31, 32 and 33 are of graded filtering properties, the one 31 being coarser, the middle one 32 of somewhat finer filtering character, the inner one 33 being the finest one of all, these degrees of fineness being determined by the coarseness or fineness of the rugosities of the crepe-paper, or its equivalent, employed in their production.

The top of such triple filter-medium is closed by a circularly-grooved, polymerized-phenolic-resin charged pasteboard or other equivalent closure 34, the grooves of which receive the upper edge portions of the three elements 31, 32 and 33, these four members being adhered together by the resin with which they are impregnated.

It will be noted that the center of this cover or closure 34 is provided with a hole 35 therethrough which is adapted to receive and to be closed by the screw 28 when such filter-medium is in the filter housing or casing 11, it being understood that such filter-medium may be used instead of the one shown in Figure 1.

An annular, resin-impregnated pasteboard or equal or substitute member 36 closes the lower ends of the annular spaces 37 and 38 between the circular filter-bodies 31 and 32 and 32 and 33, such member having a round, marginal flange engaging the external surface of element 31, equivalent ribs confining the lower border portion of the element 32 and a smaller thinner flange just inside of and engaging the element 33, such closure being adhered to the lower parts of all three elements 31, 32 and 33.

When this triple filter unit is properly mounted in the metal filter structure of Figure 1, the air to be cleaned is filtered three times, first by the coarser filter 31, then by the less coarse filter 32, and finally by the inner filter 33, thus dividing the filtration work between the three filter-elements and hence lessening the functioning action of all three and prolonging their useful life.

As will be readily understood, and as shown by the arrows in Figure 3, the contaminated air to be filtered engages first the outer surface of the larger filter-element 31 and after traversing all three filter-elements, leaves the inside of the innermost one through its lower central opening or port designated 39.

As shown in Figures 1 and 3, the three filter-elements may be arranged in any suitable relation insofar as the obliquities of their wound convolutions are concerned, and the filtration, if preferred, may take place outwardly from the inside of the innermost filter-element which, in that case, in the device of Figure 3 would be the coarsest filter-element.

Those acquainted with and skilled in this art will readily understand that the invention as defined by the appended claims is not limited and restricted to the precise and exact details of structure shown and described and that various modifications and changes may be resorted to without departure from the heart and essence of the invention and without the loss or sacrifice of any of its material advantages.

I claim:

1. For use in a filter-housing between an inlet and an outlet thereof, a filter-member including the novel combination of a plurality of separate, independent, hollow, edge-filtration elements each having parallel filter-spaces therethrough at an oblique-angle to the axis of such element for the flow of the filtrate therethrough, said filter-elements being of different transverse sizes and located inside of, and in spaced-apart relation with, one another, and a closed partition-wall between, and attached fixedly to ends of, each two adjacent filter-elements, thereby blocking the passage between such filter-elements and forming a single unitary structure.

2. The novel combination set forth in claim 1 in which each said partition-wall extends from one end of one such filter-element to the opposite end of the next filter-element, thus placing said filter-elements functionally in parallel relation.

3. The novel combination set forth in claim 1 including means closing one end of the passage through the innermost filter-element.

4. The novel combination set forth in claim 1 in which each said partition-wall extends from one end of one such filter-element to the opposite end of the next filter-element, thus placing said filter-elements functionally in parallel relation, and, including means closing one end of the passage through the innermost filter-element.

WALTER KASTEN.

REFERENCES CITED

The following references are of record in the file of this patent:

UNITED STATES PATENTS

| Number | Name | Date |
| --- | --- | --- |
| 1,564,178 | Orem | Dec. 1, 1925 |
| 1,771,042 | Ireland | July 22, 1930 |
| 1,968,016 | Dabadie | July 31, 1934 |

FOREIGN PATENTS

| Number | Country | Date |
| --- | --- | --- |
| 439,704 | France | June 21, 1912 |
| 503,050 | Germany | July 18, 1930 |